(12) United States Patent
Yoneda

(10) Patent No.: US 11,670,043 B2
(45) Date of Patent: Jun. 6, 2023

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Keigo Yoneda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 17/314,344

(22) Filed: May 7, 2021

(65) Prior Publication Data
US 2021/0358204 A1 Nov. 18, 2021

(30) Foreign Application Priority Data
May 14, 2020 (JP) .............................. JP2020-085191

(51) Int. Cl.
*G06T 15/60* (2006.01)
*G06T 7/174* (2017.01)
*G06T 7/194* (2017.01)
*G06T 15/20* (2011.01)

(52) U.S. Cl.
CPC .............. *G06T 15/60* (2013.01); *G06T 7/174* (2017.01); *G06T 7/194* (2017.01); *G06T 15/205* (2013.01)

(58) Field of Classification Search
CPC ......... G06T 15/60; G06T 7/194; G06T 7/174; G06T 15/205
See application file for complete search history.

(56) References Cited

U.S. PATENT DOCUMENTS

| 10,916,048 | B2 | 2/2021 | Yoneda |
| 2020/0145635 | A1 | 5/2020 | Yoneda |
| 2021/0120224 | A1 | 4/2021 | Yoneda |
| 2021/0134049 | A1* | 5/2021 | Sugano ................ G06T 15/205 |

FOREIGN PATENT DOCUMENTS

JP 2019-061558 A 4/2019

\* cited by examiner

*Primary Examiner* — King Y Poon
*Assistant Examiner* — Vincent Peren
(74) *Attorney, Agent, or Firm* — Carter, DeLuca & Farrell LLP

(57) ABSTRACT

A virtual viewpoint foreground image generating unit generates a virtual viewpoint foreground image, which is an image of a foreground object seen from a virtual viewpoint without a shadow, based on received multi-viewpoint images and a received virtual viewpoint parameter. A virtual viewpoint background image generating unit generates a virtual viewpoint background image, which is an image of a background object seen from the virtual viewpoint, based on the received multi-viewpoint images and virtual viewpoint parameter. A shadow mask image generating unit generates shadow mask images from the received multi-viewpoint images. A shadow-added virtual viewpoint background image generating unit renders a shadow in the virtual viewpoint background image based on the received virtual viewpoint background image, shadow mask images, and virtual viewpoint parameter. A combined image generating unit generates a virtual viewpoint image by combining the virtual viewpoint foreground image with the shadow-added virtual viewpoint background image.

19 Claims, 9 Drawing Sheets

IMAGE PROCESSING APPARATUS, IMAGE PROCESSING METHOD, AND STORAGE MEDIUM

BACKGROUND

Field

The present disclosure relates to an image processing technique to generate a virtual viewpoint image.

Description of the Related Art

There is a virtual viewpoint image generation technique as a technique to generate video seen from a virtual viewpoint virtually placed in a three-dimensional space using images captured by a plurality of imaging apparatuses.

For example, a virtual viewpoint image is generated by the method stated below First, a plurality of imaging apparatuses capture images of an object from different directions to obtain a plurality of images (multi-viewpoint images). Next, foreground images and background images are obtained from the multi-viewpoint images. A foreground image is an image obtained by extracting a foreground object area corresponding to a predetermined moving object such as a person or a ball and a shadow area of the foreground object area. A background image is an image obtained by extracting a non-moving background area other than the foreground object area and shadow area (not moving object) such as a sports arena. A foreground model indicating a three-dimensional shape of the foreground and texture data for coloring the foreground model are generated based on the foreground images. Similarly, a background model indicating a three-dimensional shape of the background and texture data for coloring the background model indicating the three-dimensional shape of the background are generated based on the background images. After that, the texture data is mapped to the foreground and background models and rendering is performed according to a virtual viewpoint indicating viewpoint information, whereby a virtual viewpoint image is generated.

The generation of the virtual viewpoint image also includes rendering of a shadow created by a light source illuminating the foreground object. As to the shadow rendering, Japanese Patent Laid-Open No. 2019-61558 discloses the method stated below Based on the virtual viewpoint, a background transformed image generated from the background image, a foreground transformed image generated from the foreground image, and a shadow transformed image generated from a difference image (shadow image) between the captured image and the background image are combined to render a shadow. This enables generation of virtual viewpoint image data on a background area including a shadow while reducing unnatural color changes even if multi-viewpoint images include images different in brightness or color due to individual differences between imaging apparatuses or differences in appearance depending on viewpoints.

However, in Japanese Patent Laid-Open No. 2019-61.558, the shadow transformed image is generated using the foreground image and the background image. If the resolution of images or the number of imaging apparatuses is increased, the amount of data required for generating a virtual viewpoint image is also increase.

SUMMARY

According to the technique of the present disclosure, an image processing apparatus obtains foreground images and background images based on images obtained by a plurality of imaging apparatuses, generates shadow mask images by extracting shadow areas from the obtained foreground images, and generates non-shadow foreground images by removing the shadow areas from the foreground images. The image processing apparatus obtains information about a virtual viewpoint. The image processing apparatus generates a virtual viewpoint foreground image based on the obtained information about the virtual viewpoint and the generated non-shadow foreground images and generates a virtual viewpoint background image based on the obtained information about the virtual viewpoint and the obtained background images. The image processing apparatus generates a shadow-added virtual viewpoint background image by rendering a shadow in the generated virtual viewpoint background image based on the shadow mask images. The image processing apparatus generates a virtual viewpoint image based on the generated virtual viewpoint foreground image and the generated shadow-added virtual viewpoint background image.

Further features of the present disclosure will become apparent from the following description of exemplary embodiments with reference to the attached drawings.

DESCRIPTION OF THE EMBODIMENTS

Preferred embodiments of the present disclosure will be hereinafter described in detail with reference to the accompanying drawings. It should be noted that the embodiments described below do not limit the present disclosure and that not all combinations of the features described in the embodiments are essential for solving the problem to be solved by the present disclosure.

First Embodiment

In the first embodiment, a description will be given of processing of generating shadow mask images based on captured images obtained from a plurality of imaging apparatuses and rendering a shadow of a foreground object in a virtual viewpoint image using the shadow mask images. The shadow mask image is treated as a binary image in the present embodiment. However, the shadow mask image is not limited to this and may be a multivalued image such as a grayscale image.

(Hardware Configuration of Image Processing System)

Figure 1A:
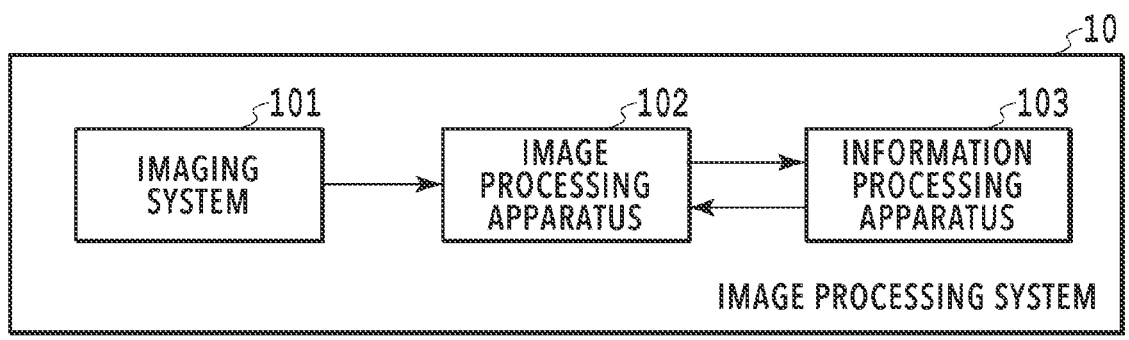
FIG. 1A is a diagram showing an example of a hardware configuration of an image processing apparatus.

FIG. 1A is a diagram showing an example of an entire configuration of an image processing system 10 according to the present embodiment. A virtual viewpoint image is an image showing a view from a viewpoint of an imaging apparatus that is virtually placed in a three-dimensional space but is actually not present (virtual viewpoint). The virtual viewpoint image is generated by a user and/or an elected operator or the like freely controlling the position and orientation of the virtual viewpoint. The virtual viewpoint image is also referred to as a free-viewpoint image or an arbitrary viewpoint image. It should be noted that the word "image" encompasses both of a moving image and a still image unless otherwise specified. That is, the image processing system 10 can process both of a moving image and a still image.

The image processing system 10 includes an imaging system 101, an image processing apparatus 102, and an information processing apparatus 103, and is capable of generating a virtual viewpoint image.

The imaging system 101 arranges a plurality of imaging apparatuses at different positions and captures images of the same object synchronously from multiple viewpoints to obtain multi-viewpoint images. The imaging system 101 transmits the obtained multi-viewpoint images to the image processing apparatus 102.

The image processing apparatus 102 generates a virtual viewpoint image seen from a designated virtual viewpoint based on the received multi-viewpoint images. The image processing apparatus 102 can generate an image seen from a viewpoint different from any of the imaging apparatuses of the imaging system 101, that is, a virtual viewpoint image. The virtual viewpoint is represented by a camera parameter determined by the information processing apparatus 103 to be described later. The image processing apparatus 102 sequentially generates a virtual viewpoint image from the received multi-viewpoint images and transmits the generated virtual viewpoint image to the information processing apparatus 103.

The information processing apparatus 103 comprises a controller for controlling the virtual viewpoint and a display unit which displays the status of the virtual viewpoint and the like. The controller includes a joystick, a knob, a jog dial or the like for controlling the virtual viewpoint in addition to a general input device for user input operation such as a keyboard or a mouse. The display unit is at least one display device (hereinafter referred to as "monitor") for displaying information necessary for a user. For example, in a case where a touch panel display is used as the display device, the touch panel can also function as the controller described above. The monitor displays a virtual viewpoint image or a UI screen for virtual viewpoint control such that a user designates the amount of operation of the virtual viewpoint, that is, a moving direction, orientation, rotation, moving distance, moving speed and the like, while watching the monitor. The information processing apparatus 103 determines a virtual viewpoint parameter of the virtual viewpoint from the amount of operation designated by the user and transmits the parameter to the image processing apparatus 102. The virtual viewpoint parameter may include a parameter for designating at least one of a position, orientation, and ZOOM. The position of the virtual viewpoint designated by the virtual viewpoint parameter may be represented by three-dimensional coordinates. The position designated by the virtual viewpoint parameter may be represented by coordinates in a rectangular coordinate system of three axes: X, Y, and Z axes. The origin point may be any position in the three-dimensional space. The orientation of the virtual viewpoint designated by the virtual viewpoint parameter may be represented by angles formed with three axes: pan, tilt, and roll. The zoom of the virtual viewpoint designated by the virtual viewpoint parameter is represented by, for example, a single axis of a focal length. The information processing apparatus 103 can control these parameters. The virtual viewpoint parameter may include a parameter specifying a different element and does not necessarily include all of the parameters stated above. The information processing apparatus 103 can receive a virtual viewpoint image generated by the image processing apparatus 102 and display the image on the monitor.

Figure 1B:
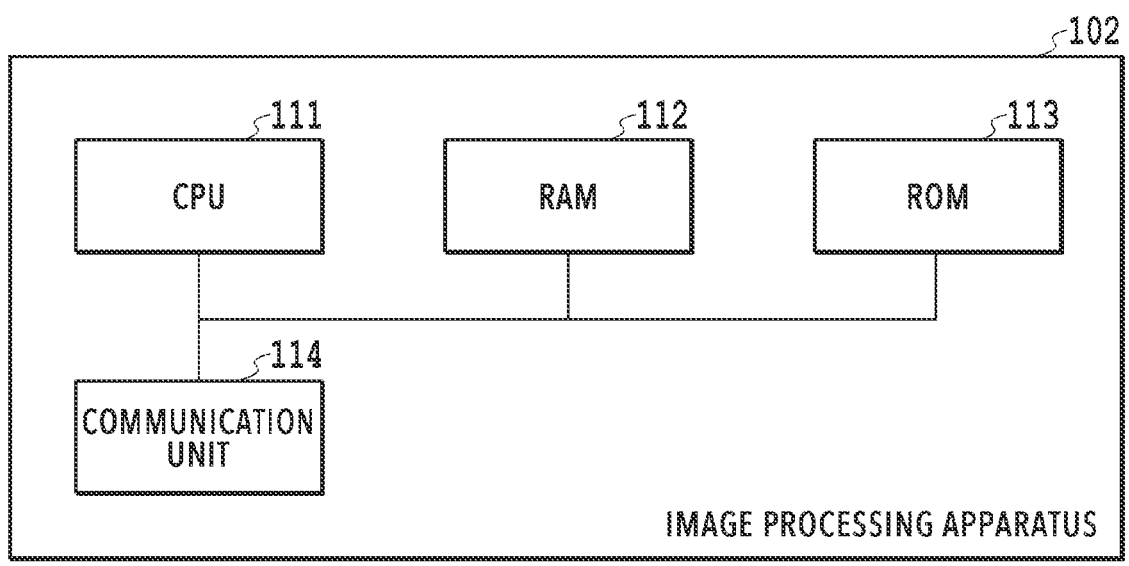
FIG. 1B is a diagram showing an example of a hardware configuration of an image processing apparatus.

FIG. 1B is a diagram showing an example of a hardware configuration of the image processing apparatus 102. The image processing apparatus 102 includes a CPU 111, a RAM 112, a ROM 113, and a communication unit 114. The CPU 111 is a processor which executes a program stored in the ROM 113 using the RAM 112 as a work memory to exercise control over the components of the image processing apparatus 102. The CPU 111 executes various programs, thereby realizing the function of each processing unit shown in FIG. 2 to be described later. The RAM 112 temporarily stores a computer program read from the ROM 113, a running total of calculations, and the like. The ROM 113 stores computer programs and data which do not require change. The ROM 113 also stores camera parameters of the imaging apparatuses, a background model, data necessary for rendering a shadow in a virtual viewpoint image from shadow mask images such as threshold 1 and threshold 2 shown in FIG. 5, and the like. The communication unit 114 comprises communication means such as Ethernet or USB to communicate with the imaging system 101 and the information processing apparatus 103.

(Functional Configuration of Image Processing Apparatus)

Figure 2:
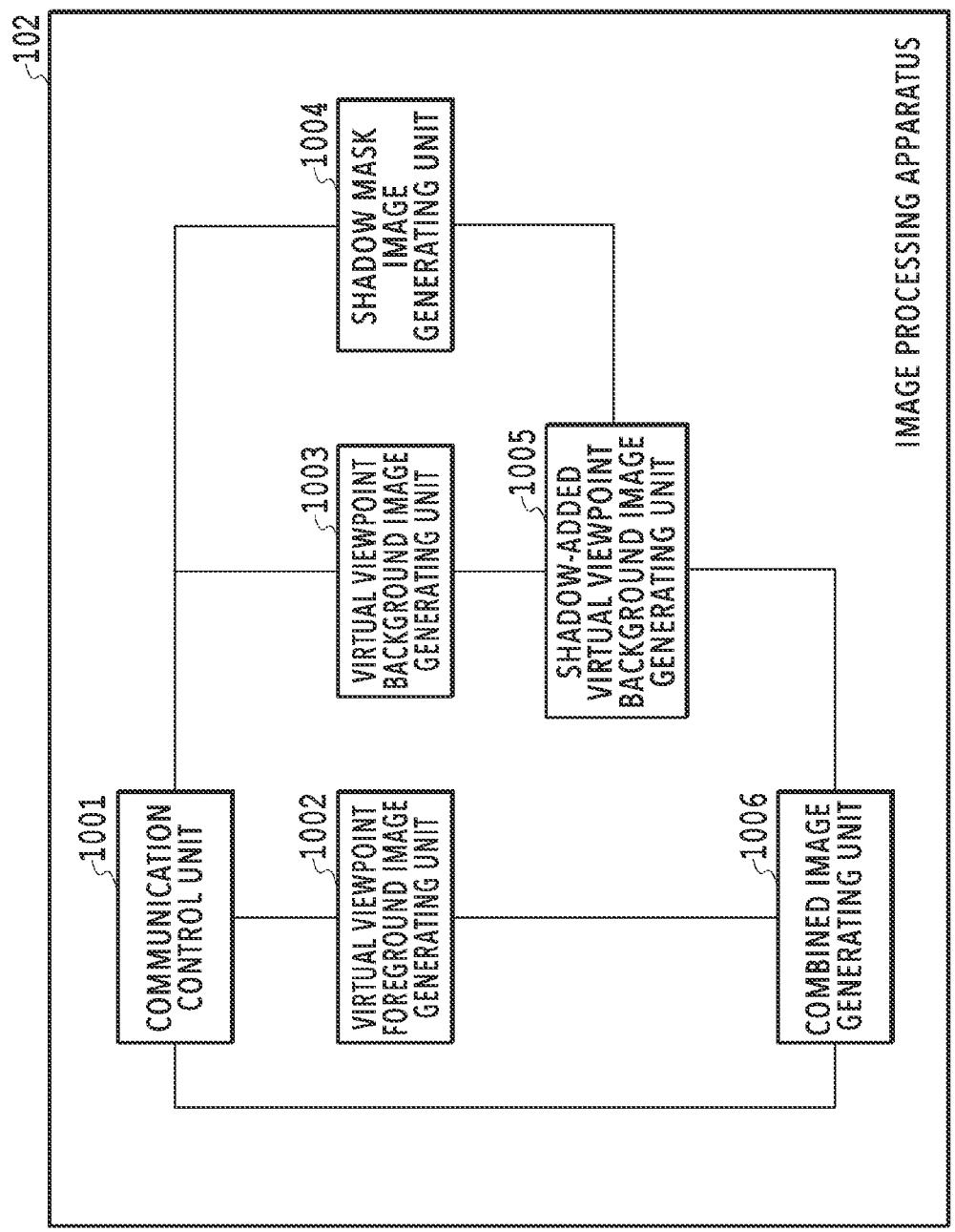
FIG. 2 is a diagram showing an example of a functional configuration of the image processing apparatus.

FIG. 2 is a diagram showing an example of a functional configuration of the image processing apparatus 102 relating to shadow rendering processing using shadow mask images.

The image processing apparatus 102 includes a communication control unit 1001, a virtual viewpoint foreground image generating unit 1002, a virtual viewpoint background image generating unit 1003, a shadow mask image generating unit 1004, a shadow-added virtual viewpoint background image generating unit 1005, and a combined image generating unit 1006.

The communication control unit 1001 uses the communication unit 114 to receive information such as multi-viewpoint images from the imaging system 101 and a virtual viewpoint parameter from the information processing apparatus 103. The communication control unit 1001 outputs the received information to the virtual viewpoint foreground image generating unit 1002, the virtual viewpoint background image generating unit 1003, and the shadow mask image generating unit 1004. The communication control unit 1001 also receives a virtual viewpoint image from the combined image generating unit 1006 and transmits the image to the information processing apparatus 103.

The virtual viewpoint foreground image generating unit 1002 generates a virtual viewpoint foreground image, which is an image of a foreground object seen from a virtual viewpoint without a shadow, based on the multi-viewpoint images and virtual viewpoint parameter received from the communication control unit 1001. Processing performed by the virtual viewpoint foreground image generating unit 1002 is roughly classified into processing of generating foreground images from the multi-viewpoint images, processing of removing shadows from the foreground images, and processing of generating a virtual viewpoint foreground image seen from a virtual viewpoint based on the foreground images and virtual viewpoint parameter. First, the virtual viewpoint foreground image generating unit 1002 performs foreground/background separation processing for the multi-viewpoint images to generate foreground images. The foreground image is an image obtained by extracting a moving area (foreground object area and its shadow area) from a captured image of an object captured by an imaging apparatus. The moving area to be extracted indicates an area of a predetermined size or more which is moving (whose absolute position and shape are changeable) between temporally-adjacent captured images out of captured images obtained by capturing by a fixed imaging apparatus from the same direction. In a case where an imaging apparatus captures images while moving, an object whose movement, exclusive of movement of the imaging apparatus, is equal to or larger than a predetermined amount is selected as a movable object, that is, a foreground object, from among objects moving between the captured images. The foreground object may be, for example, a person such as a player or referee in a playing field, a ball or the like in the case of a ball game, or a singer, player, performer, or host at a concert or entertainment.

Next, the virtual viewpoint foreground image generating unit 1002 removes the shadow area from each foreground image to generate a non-shadow foreground image. Although a shadow of the foreground object created by a light source illuminating the foreground object is also a moving object, the foreground object and its shadow are differentiated from each other in the present embodiment. The way to differentiate the foreground object from its shadow will be described later.

Next, the virtual viewpoint foreground image generating unit 1002 generates a foreground model indicating a three-dimensional shape of the foreground object and foreground texture data for coloring the foreground model based on the non-shadow foreground images and the camera parameters of the imaging apparatuses prestored in the ROM 113. The virtual viewpoint foreground image generating unit 1002 maps the foreground texture data to the foreground model based on the virtual viewpoint parameter, thereby generating a virtual viewpoint foreground image. The virtual viewpoint foreground image generating unit 1002 outputs the generated virtual viewpoint foreground image to the combined image generating unit 1006. The method of generating a virtual viewpoint foreground image is not limited to this and may be various methods such as a method of generating a virtual viewpoint foreground image by a projective transformation of the non-shadow foreground images without using the foreground model.

The virtual viewpoint background image generating unit 1003 generates a virtual viewpoint background image, which is an image of a background object seen from the virtual viewpoint, based on the multi-viewpoint images and virtual viewpoint parameter received from the communication control unit 1001. Processing performed by the virtual viewpoint background image generating unit 1003 is roughly classified into processing of generating background images from the multi-viewpoint images and processing of generating a virtual viewpoint background image seen from the virtual viewpoint based on the background images and virtual viewpoint parameter. First, the virtual viewpoint background image generating unit 1003 performs foreground/background separation processing for the multi-viewpoint images to generate background images. The background image is an image obtained by removing the foreground object and the shadow area of the foreground image from a captured image. A background object in the background image indicates an object which moves in less than a predetermined amount between temporally-adjacent captured images out of captured images obtained by capturing by a fixed imaging apparatus from the same direction. That is, the background object indicates an object which remains at rest or nearly at rest. In a case where an imaging apparatus captures images while moving, an object whose movement, exclusive of movement of the imaging apparatus, is smaller than a predetermined amount is selected as a background object from among objects moving between captured images. The background object is, for example, a stage of a concert or the like, a stadium for an event such as a game, a structure such as a goal used for a ball game, a field, and the like. It should be noted that the background object is an object different from at least the foreground object and its shadow and may include an object other than the above-mentioned objects.

Alternatively, multi-viewpoint images obtained by capturing images of only the background object without the foreground object may be used as the background images. In this case, the foreground/background separation processing can be omitted.

Next, based on the background images, the camera parameters of the imaging apparatuses stored in the ROM 113 and obtained in advance, and a background model indicating a three-dimensional shape of the background object such as a stadium, the virtual viewpoint background image generating unit 1003 generates background texture data for coloring the background model. The virtual viewpoint background image generating unit 1003 maps the background texture data to the background model, thereby generating a virtual viewpoint background image. The virtual viewpoint background image generating unit 1003 outputs the generated virtual viewpoint background image to the shadow-added virtual viewpoint background image generating unit 1005. The method of generating a virtual viewpoint background image is not limited to this and may be, for example, a projective transformation method like the virtual viewpoint foreground image.

The shadow mask image generating unit 1004 generates shadow mask images from the received multi-viewpoint images. The shadow mask image generating unit 1004 first extracts a moving object area showing a moving object including both of a foreground object and its shadow and a not moving object area showing a not moving object from each multi-viewpoint image and sets the former as a foreground image and the latter as a background image. The shadow mask image generating unit 1004 may obtain the foreground image and the background image generated in the virtual viewpoint foreground image generating unit 1002 and the virtual viewpoint background image generating unit 1003. Next, the shadow mask image generating unit 1004 separates the foreground image into a foreground area and a shadow area. As a separation method, for example, pixel values of a different captured image in which a pixel area within the capturing range is a not moving object area are prestored for each imaging apparatus. A difference between pixel values of a moving object area of each captured image and the prestored pixel values of the different captured image whose pixel area is a not moving object area is calculated in an RGB space. In a case where the difference value is equal to or greater than a certain threshold, the area is determined to be a foreground object area. In a case where the difference value is less than the threshold, the area is determined to be a shadow area. By this separation method, a part of the moving object area having a color similar to the color of the moving object area of the background to a certain extent as compared with the foreground object can be detected as a shadow area.

The shadow mask image generating unit 1004 then binarizes the shadow area of each captured image including the moving object area to generate a shadow mask image. However, the method of generating shadow mask images is not limited to this. The shadow mask image generating unit 1004 outputs the generated shadow mask images to the shadow-added virtual viewpoint background image generating unit 1005. As mentioned above, the shadow mask images are not limited to binary images and may be multi-valued images. In order to reduce the amounts of information of shadow mask images, only a shadow area may be extracted from each shadow mask image. In this case, the shadow mask image generating unit 1004 outputs the extracted shadow mask images and information indicating the positions of the extracted areas in the respective captured images to the shadow-added virtual viewpoint background image generating unit 1005.

The shadow-added virtual viewpoint background image generating unit 1005 renders a shadow in the virtual viewpoint background image based on the received virtual viewpoint background image, shadow mask images, and virtual viewpoint parameter. The virtual viewpoint parameter is received from the communication control unit 1001 via the virtual viewpoint background image generating unit 1003 or the shadow mask image generating unit 1004. The method of rendering a shadow in the virtual viewpoint background image using the shadow mask images will be described later in detail with reference to FIG. 4 and FIG. 5. The shadow-added virtual viewpoint background image generating unit 1005 outputs the generated shadow-added virtual viewpoint background image to the combined image generating unit 1006.

The combined image generating unit 1006 combines the virtual viewpoint foreground image input from the virtual viewpoint foreground image generating unit 1002 with the shadow-added virtual viewpoint background image input from the shadow-added virtual viewpoint background image generating unit 1005, thereby generating a virtual viewpoint image in which the foreground, background, and shadow are rendered. The combined image generating unit 1006 transmits the generated virtual viewpoint image to the communication control unit 1001.

Figure 3A:
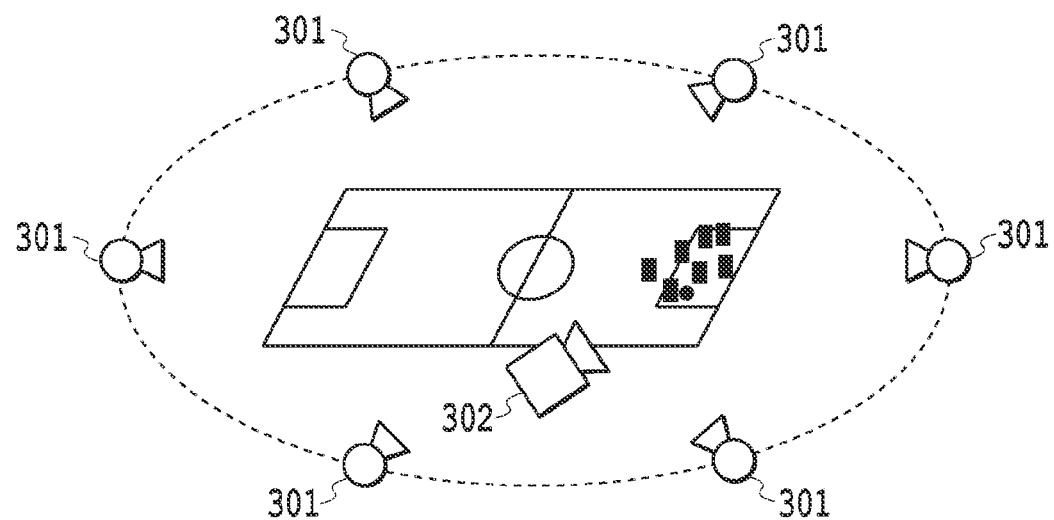
FIG. 3A is a schematic diagram showing a method of generating a virtual viewpoint image.
Figure 3B:
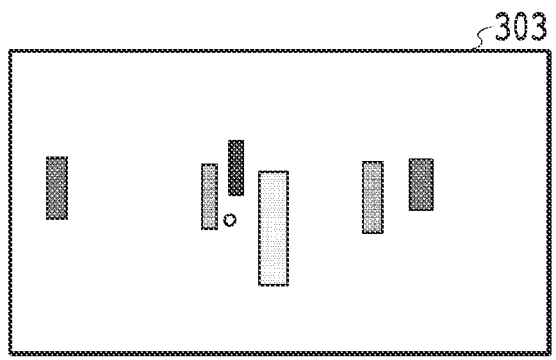
FIG. 3B is a schematic diagram showing the method of generating a virtual viewpoint image.
Figure 3C:
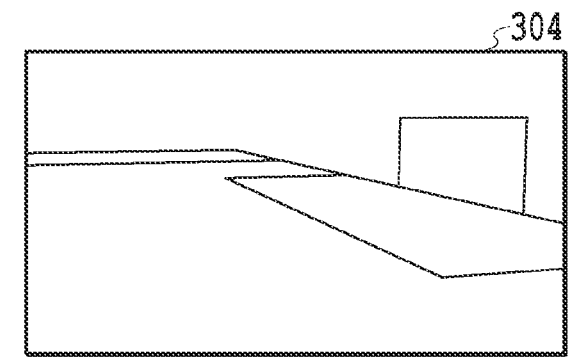
FIG. 3C is a schematic diagram showing the method of generating a virtual viewpoint image.
Figure 3D:
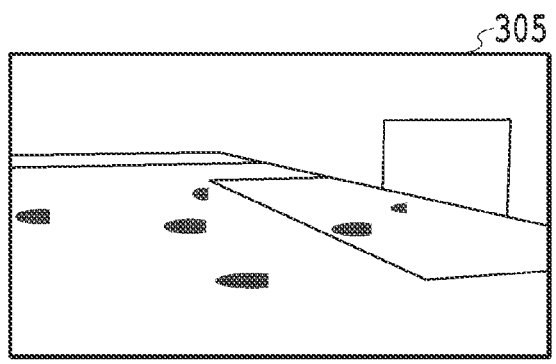
FIG. 3D is a schematic diagram showing the method of generating a virtual viewpoint image.
Figure 3E:
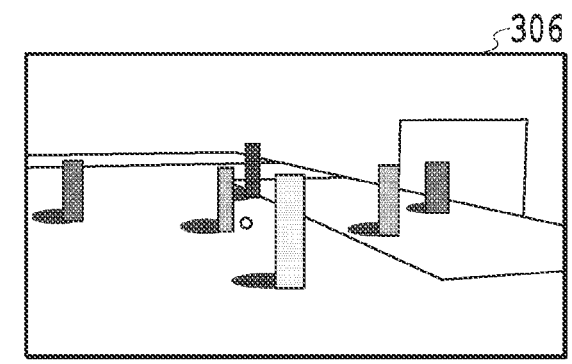
FIG. 3E is a schematic diagram showing the method of generating a virtual viewpoint image.

The procedure of generating a virtual viewpoint image is briefly described below with reference to FIGS. 3A to 3E. FIG. 3A is a schematic diagram showing the situation where an imaging apparatus group 301 captures images of objects from different directions and a virtual viewpoint 302 is oriented toward the objects in a position and orientation different from any of the imaging apparatuses. The imaging apparatus group 301 is a part of the imaging system 101 and transmits multi-viewpoint images to the image processing apparatus 102. The virtual viewpoint 302 is controlled by a user operating the information processing apparatus 103. The information processing apparatus 103 determines a virtual viewpoint parameter based on user input and transmits the determined virtual viewpoint parameter to the image processing apparatus 102. The information processing apparatus 103 also receives a virtual viewpoint image from the image processing apparatus 102 and displays it on the monitor such that a user can see the virtual viewpoint image. FIG. 3B shows a virtual viewpoint foreground image 303 generated by the virtual viewpoint foreground image generating unit 1002. The virtual viewpoint foreground image 303 is generated based on a foreground model and foreground texture data generated based on foreground object areas obtained by removing shadow areas from foreground images generated from the multi-viewpoint images transmitted from the imaging apparatus group 301, and the virtual viewpoint parameter. FIG. 3C shows a virtual viewpoint background image 304 generated by the virtual viewpoint background image generating unit 1003. The virtual viewpoint background image 304 is generated based on a background model and background texture data generated based on background images generated from the multi-viewpoint images transmitted from the imaging apparatus group 301, and the virtual viewpoint parameter. FIG. 3D shows a shadow-added virtual viewpoint background image 305 generated by the shadow-added virtual viewpoint background image generating unit 1005. The shadow-added virtual viewpoint background image 305 is generated based on shadow mask images generated by the shadow mask image generating unit 1004 from the multi-viewpoint images transmitted from the imaging apparatus group 301, the background model, and the virtual viewpoint parameter. FIG. 3E shows a virtual viewpoint image 306 generated by the combined image generating unit 1006. The virtual viewpoint image 306 is generated by combining the virtual viewpoint foreground image 303 with the shadow-added virtual viewpoint background image 305.

The above procedure enables generation of a final virtual viewpoint image in which the shadows of the foreground objects are rendered using the shadow mask images.

(Method of Rendering Shadow-added Virtual Viewpoint Background Image Using Shadow Mask Images)

Figure 4:
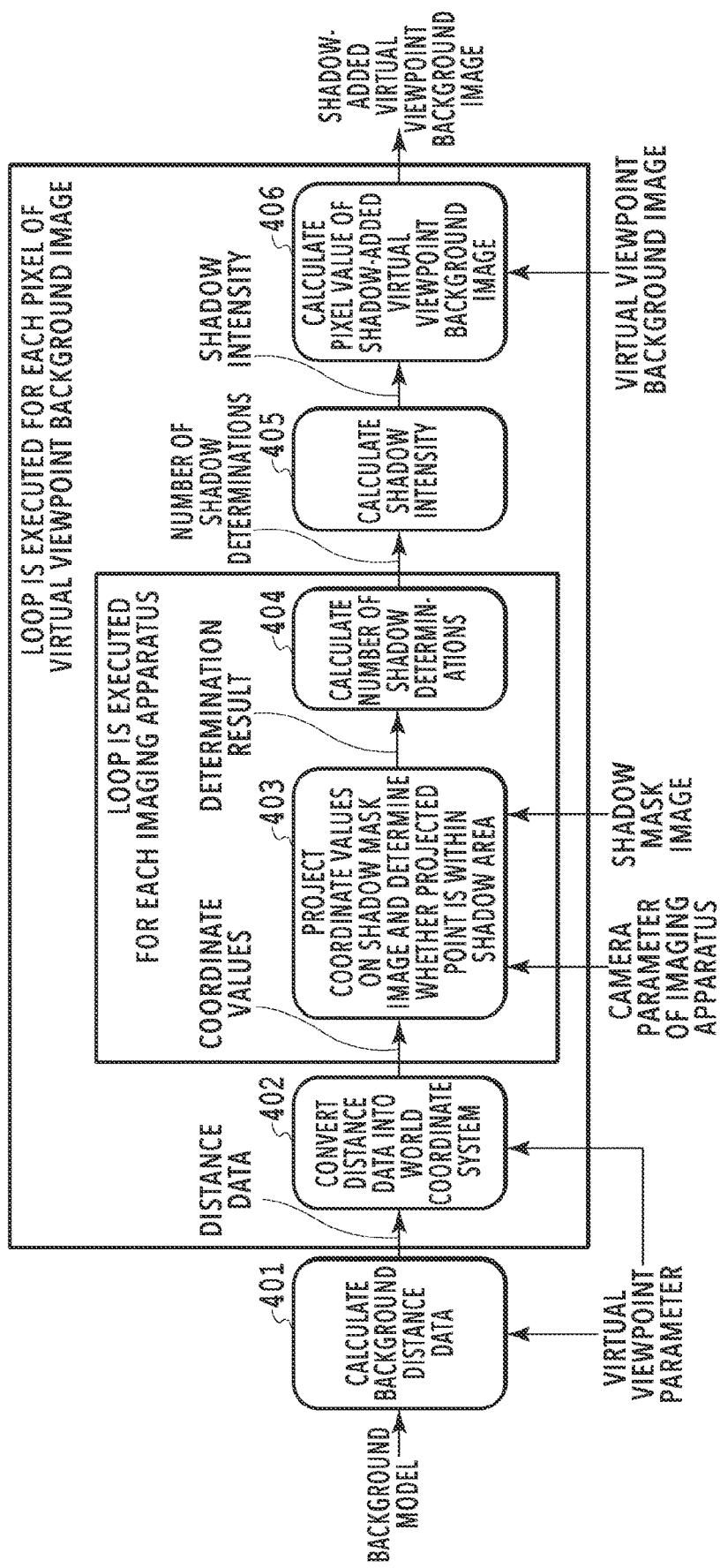
FIG. 4 is a schematic diagram showing a method of generating a shadow-added virtual viewpoint background image.
Figure 5:
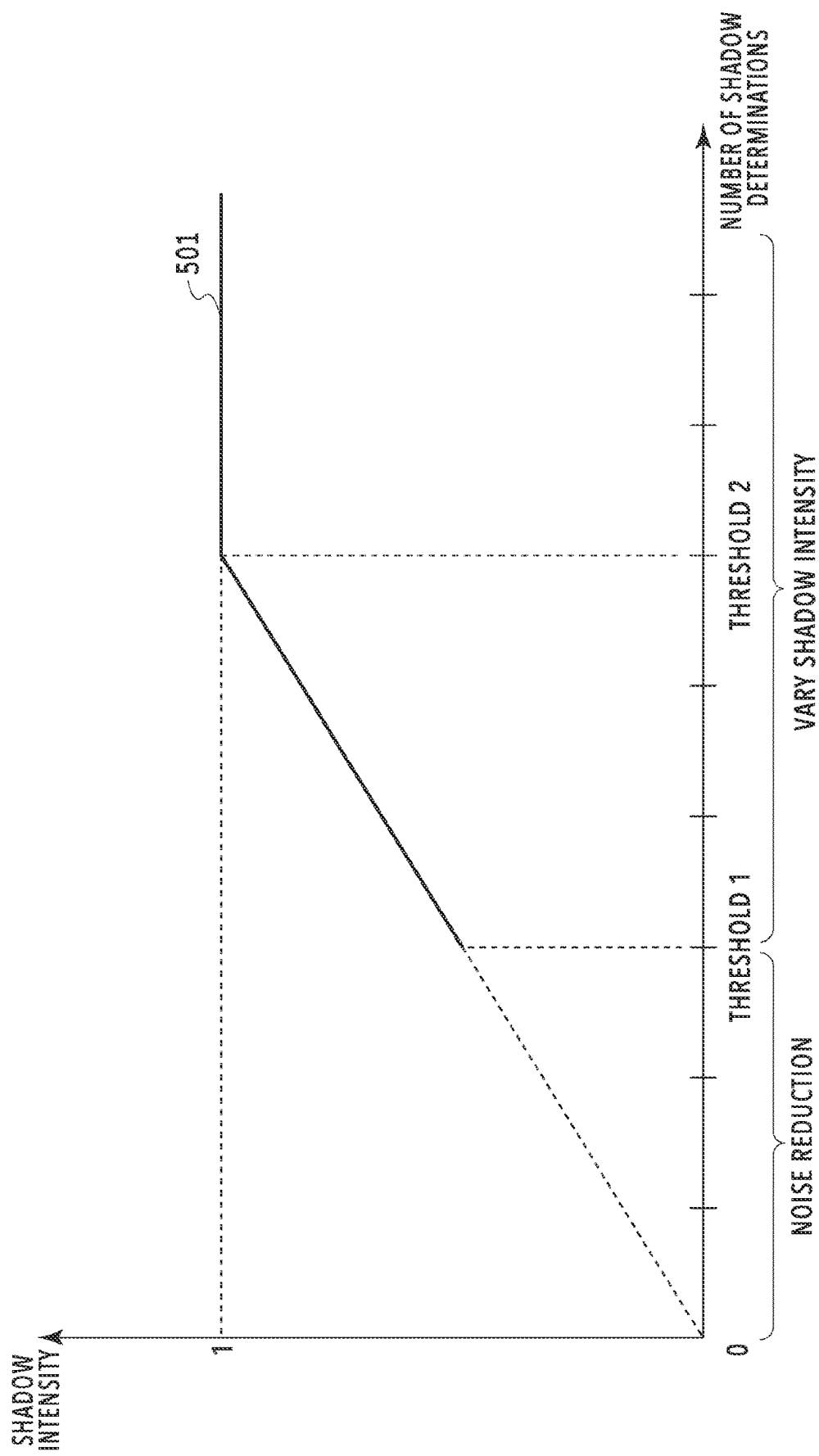
FIG. 5 is a schematic diagram showing a method of calculating the intensity of a shadow.

The method of rendering a shadow-added virtual viewpoint background image using a plurality of shadow mask images is described below with reference to FIG. 4 and FIG. 5. FIG. 4 is a diagram illustrating the procedure of the shadow rendering method. Processing 401 to processing 406 indicate items of processing necessary for shadow rendering. An arrow pointing each item of processing indicates input data and an arrow extending from each item of processing indicates output data.

Processing 401 receives input of a virtual viewpoint parameter and a background model and calculates and outputs distance data indicating a distance from the virtual viewpoint to an object shown in each pixel of a virtual viewpoint background image. The distance data is calculated from shape model data such as a point group or polygon using Z-buffering or the like.

Processing 402 to processing 406 are performed for each target pixel of the virtual viewpoint background image and repeated the same number of times as the number of pixels included in the virtual viewpoint background image.

Processing 402 receives input of the distance data on a target pixel and the virtual viewpoint parameter, converts the distance data into coordinate values in a world coordinate system, and outputs the coordinate values. The world coordinate system shows an entire three-dimensional space where there is an object whose image is captured by an imaging apparatus and is represented by coordinates in a rectangular coordinate system of three axes: X, Y, and Z axes. Processing 403 and processing 404 are performed for each target imaging apparatus and repeated the same number of times as the number of imaging apparatuses.

Processing 403 receives input of the coordinate values, a camera parameter of a target imaging apparatus, and a shadow mask image generated from a captured image captured from the target imaging apparatus at the same time as the virtual viewpoint background image, Processing 403 projects the coordinate values on the shadow mask image based on the camera parameter, determines whether a pixel area of the shadow mask image on which the coordinate values are projected matches the shadow area of the shadow mask image, and outputs the determination result.

Processing 404 receives input of the determination result and outputs the number of times it is determined that a pixel area of the shadow mask image on which the coordinate values are projected matches the shadow area of the shadow mask image (number of shadow determinations). Thus, in a case where all the imaging apparatuses capture images of the same shadow area, the number of shadow determinations is equal to the number of imaging apparatuses. However, even though the imaging apparatuses capture images of the same shadow, the number of shadow determinations is less than the number of imaging apparatuses which captured the images of the shadow in a case where the shadow areas are extracted from some of the captured images but are not extracted from the other captured images. In addition, even though the shadow is the same, in a case where a shadow area detection rate differs between a dark color area and a light color area, the number of shadow determinations increases as the color of an area becomes darker.

Processing 405 receives input of the number of shadow determinations and outputs a shadow intensity. The shadow intensity is represented by w, which ranges from 0.0 to 1.0. In a case where w is 0.0, there is no shadow. In a case where w is 1, a shadow is rendered at high intensity. In a case where w is 0.5, the shadow intensity is half of that in the case where w is 1. The method of calculating the shadow intensity w will be described later in detail.

Processing 406 receives input of the shadow intensity w and a pixel value $RGB_{background}$ of the target pixel of the virtual viewpoint background image and outputs a pixel value $RGB_{shadow}$ of a target pixel of a shadow-added virtual viewpoint background image. For example, the pixel value of the target pixel of the shadow-added virtual viewpoint background image is calculated by formula 1 below. A black color can be blended into the virtual viewpoint background image and a portion corresponding to the shadow can be darkened by formula 1, It should be noted that alpha defines the amount of black to be blended and ranges from 0.0 to 1.0.

$$RGB_{shadow} = RGB_{background} \times (1.0 - w \times \text{alpha}) \quad (1)$$

The method of calculating the shadow intensity w is described below with reference to FIG. 5. In graph 501 of FIG. 5, the horizontal axis represents the number of shadow determinations and the vertical axis represents the shadow intensity. The shadow intensity w is controlled by the number of shadow determinations, threshold 1, and threshold 2, In a case where the number of shadow determinations is equal to or greater than threshold 2, since the coordinate values calculated in processing 402 are projected on a lot of shadow mask images, the coordinate values are considered to have a high probability of being a shadow. Thus, the shadow intensity w is 1. In a case where the number of shadow determinations is equal to or greater than threshold 1 and less than threshold 2, since the area has a high probability of not being a shadow area depending on the viewpoint of an imaging apparatus, the shadow intensity is linearly varied. That is, the intensity of a shadow to be rendered can be changed depending on the number of shadow determinations. In a case where the number of shadow determinations is less than threshold 1, since there is a high probability that a shadow area is mistakenly detected at the generation of the shadow mask images from the multi-viewpoint images, no shadow is rendered. That is, noise elimination can be performed.

In the manner described above, the intensity of a shadow to be rendered in the virtual viewpoint background image can be changed using the shadow mask images. Further, setting the parameters of threshold 1 and threshold 2 enables rendering of a natural shadow while reducing the influence of differences in appearance of the shadow caused by the positional relationships of the imaging apparatuses to the light source, differences in representation of the shadow caused by differences in settings such as exposure between the imaging apparatuses, and the like, in the present embodiment, in a case where there are shadow mask images of all the imaging apparatuses, the shadow mask images are used to calculate the shadow intensity w. However, the calculation method is not limited to this and the shadow intensity w may be calculated using only shadow mask images generated from captured images of some of the imaging apparatuses close to the virtual viewpoint, for example. In this case, the amount of data of shadow information can be further reduced. In a case where shadow mask images are grayscale images, shading information on the shadow mask images can be reflected in the shadow intensity w and the method of calculating the shadow intensity w is not limited to the above method.

In the above method, distance data indicating a distance from the virtual viewpoint to each pixel of the virtual viewpoint background image is converted into coordinate values in the world coordinate system and the coordinate values are projected on the shadow mask image of each imaging apparatus. However, the relationship can be reversed such that distance data indicating a distance from an imaging apparatus to each pixel of a shadow in a shadow mask image is converted into coordinate values in the world coordinate system and the coordinate values of each shadow mask image are projected on the virtual viewpoint background image. In this case, the shadow intensity may be determined based on the number of times the coordinate values are projected on the same pixel in the virtual viewpoint background image. The intensity of a shadow to be rendered increases with the number of times the coordinate values are projected on the same pixel.

(Control of Shadow Rendering Using Shadow Mask Images)

Figure 6:
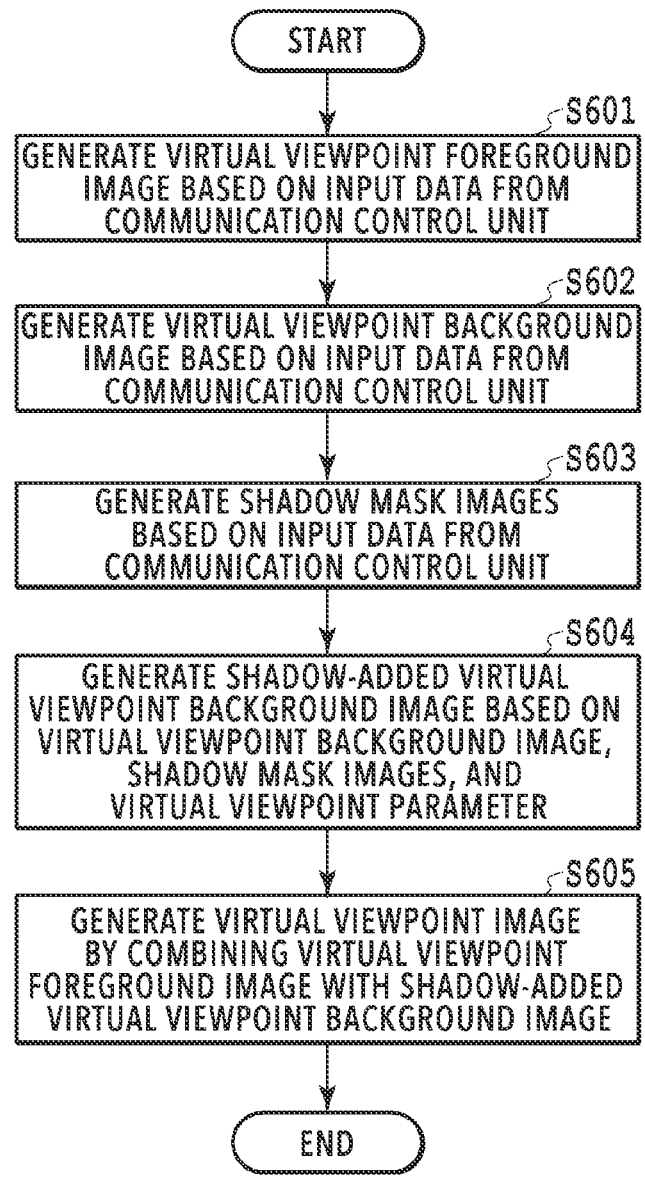
FIG. 6 is a flowchart showing an example of image processing.

FIG. 6 is a flowchart showing the procedure of controlling shadow rendering in a virtual viewpoint image using shadow mask images according to the present embodiment. A control program stored in the ROM 113 is loaded into the RAM 112 and executed by the CPU 111, whereby the flow shown in FIG. 6 is implemented. The execution of the flow of FIG. 6 is started in a case where the image processing apparatus 102 receives multi-viewpoint images from the imaging system 101 and a virtual viewpoint parameter from the information processing apparatus 103. The start of execution of the flow of FIG. 6 may be triggered by the communication control unit 1001 transmitting reception data to the virtual viewpoint foreground image generating unit 1002, the virtual viewpoint background image generating unit 1003, and the shadow mask image generating unit 1004.

In S601, the virtual viewpoint foreground image generating unit 1002 generates a virtual viewpoint foreground image based on the input data from the communication control unit 1001. The generated virtual viewpoint foreground image is output to the combined image generating unit 1006.

In S602, the virtual viewpoint background image generating unit 1003 generates a virtual viewpoint background image based on the input data from the communication control unit 1001. The generated virtual viewpoint background image is passed to the shadow-added virtual viewpoint background image generating unit 1005.

In S603, the shadow mask image generating unit 1004 generates shadow mask images based on the input data from the communication control unit 1001. The generated shadow mask images are passed to the shadow-added virtual viewpoint background image generating unit 1005.

In S604, the shadow-added virtual viewpoint background image generating unit 1005 generates a shadow-added virtual viewpoint background image based on the virtual viewpoint background image and shadow mask images received from the virtual viewpoint background image generating unit 1003 and the shadow mask image generating unit 1004, and the virtual viewpoint parameter. The generated shadow-added virtual viewpoint background image is output to the combined image generating unit 1006.

In S605, the combined image generating unit 1006 generates a virtual viewpoint image by combining the virtual viewpoint foreground image received from the virtual viewpoint foreground image generating unit 1002 with the shadow-added virtual viewpoint background image received from the shadow-added virtual viewpoint background image generating unit 1005. The generated virtual viewpoint image is transmitted to the communication control unit 1001 and the flow is ended.

After the end of the flow, the communication control unit 1001 transmits the received virtual viewpoint image to the information processing apparatus 103.

S601 to S603 shown in FIG. 6 are described as sequential processing but may be parallel processing.

As described above, in the present embodiment, shadow mask images are generated from multi-viewpoint images and used to render a shadow of a foreground object in a virtual viewpoint image. Since shadow information for separately rendering a foreground object and a shadow of the foreground object is treated as the number of overlaps of shadow mask images, the amount of data and throughput relating to shadow rendering can be reduced as compared with color images of the shadow for example.

Second Embodiment

In the first embodiment, processing of generating shadow mask images from multi-viewpoint images and rendering a shadow in a virtual viewpoint image based on the shadow mask images in a single image processing apparatus has been described. In the second embodiment, a description will be (given of the aspect in which there are two image processing apparatuses, a first image processing apparatus generates foreground images, background images, and shadow mask images, and a second image processing apparatus uses these images to generate a virtual viewpoint image. A description of the portions of hardware and software configurations common to the first and second embodiments will be omitted or simplified below so as to concentrate on different portions.

Figure 7:
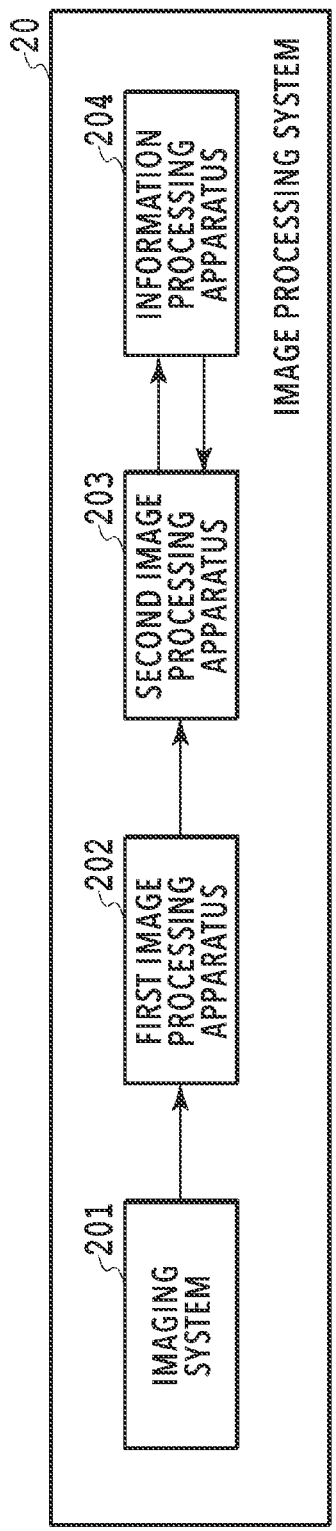
FIG. 7 is a diagram showing an example of a hardware configuration of an image processing apparatus.

FIG. 7 is a diagram showing an example of an entire configuration of an image processing system 20 according to the present embodiment.

The image processing system 20 includes an imaging system 201, a first image processing apparatus 202, a second image processing apparatus 203, and an information processing apparatus 204. The imaging system 201 and the information processing apparatus 204 are identical to the imaging system 101 and the information processing apparatus 103 in FIG. 1, respectively.

The first image processing apparatus 202 generates a non-shadow foreground image, a background image, and a shadow mask image from a captured image obtained from each imaging apparatus based on a multi-viewpoint image. The first image processing apparatus 202 transmits the images to the second image processing apparatus 203 that is an external apparatus.

The second image processing apparatus 203 generates a virtual viewpoint image based on the non-shadow foreground images, background images, and shadow mask images received from the first image processing apparatus 202 that is an external apparatus, and a virtual viewpoint parameter received from the information processing apparatus 204. The second image processing apparatus 203 transmits the generated virtual viewpoint image to the information processing apparatus 204.

The hardware configuration of each of the first image processing apparatus and the second image processing apparatus is identical to that of the image processing apparatus 102 shown in FIG. 1B.

Figure 8A:
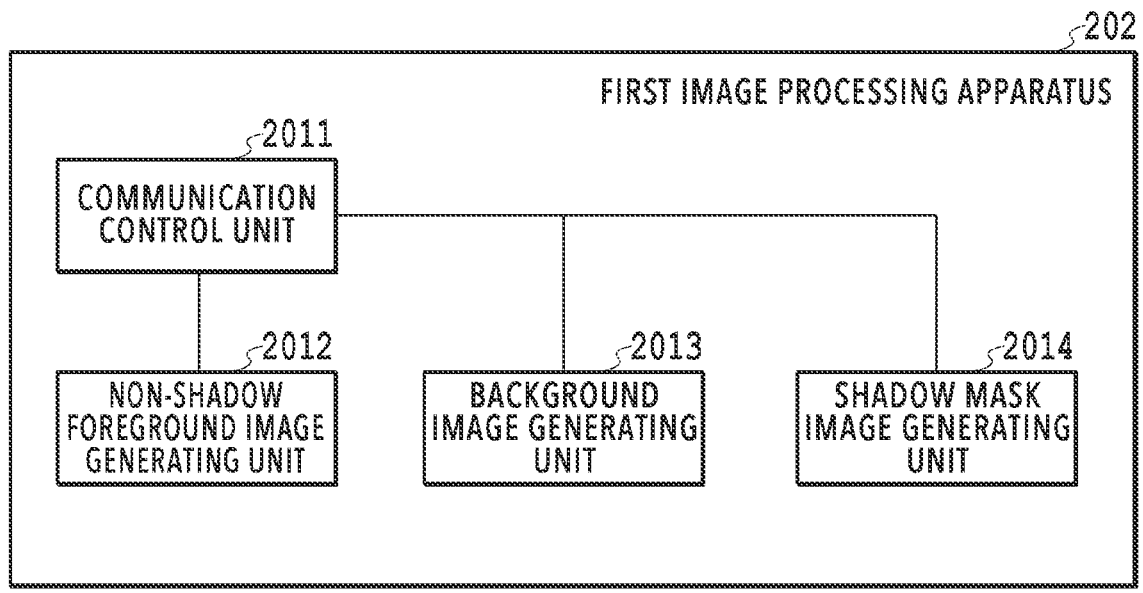
FIG. 8A is an example of a functional configuration of an image processing apparatus.
Figure 8B:
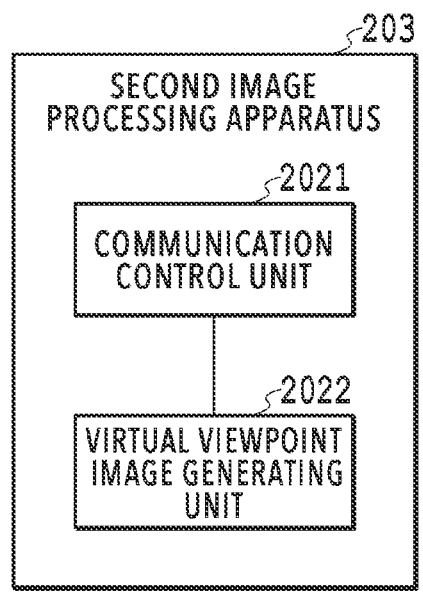
FIG. 8B is an example of a functional configuration of an image processing apparatus.

FIGS. 8A and 8B are diagrams showing an example of functional configurations of the first image processing apparatus 202 and the second image processing apparatus 203.

A communication control unit 2011 receives multi-viewpoint images from the imaging system 201 and transmits the images to a non-shadow foreground image generating unit 2012, a background image generating unit 2013, and a shadow mask image generating unit 2014. The communication control unit 2011 also receives generated images from the non-shadow foreground image generating unit 2012, the background image generating unit 2013, and the shadow mask image generating unit 2014 and transmits the images to the second image processing apparatus 203.

The non-shadow foreground image generating unit 2012, the background image generating unit 2013, and the shadow mask image generating unit 2014 generate foreground images, background images, and shadow mask images, respectively, from the received multi-viewpoint images. The method of generating each type of image is the same as that described in the first embodiment. The non-shadow foreground image generating unit 2012, the background image generating unit 2013, and the shadow mask image generating unit 2014 transmit the respective generated images to the communication on control unit 2011.

A communication control unit 2021 transmits the non-shadow foreground images, background images, and shadow mask images received from the first image processing apparatus 202 and the virtual viewpoint parameter received from the information processing apparatus 204 to a virtual viewpoint image generating unit 2022. The communication unit 2021 also receives a virtual viewpoint image from the virtual viewpoint image generating unit 2022 and transmits the image to the information processing apparatus 204.

The virtual viewpoint image generating unit 2022 generates a virtual viewpoint image based on the non-shadow foreground images, background images, shadow mask images, and virtual viewpoint parameter received from the communication control unit 2021. The method of generating a virtual viewpoint image is the same as that in the first embodiment. A virtual viewpoint foreground image is first generated from the non-shadow foreground images and a virtual viewpoint background image is then generated from the background images. After that, a shadow is rendered in the virtual viewpoint background image using the shadow mask images to generate a shadow-added virtual viewpoint background image. Finally, the virtual viewpoint foreground image is combined with the shadow-added virtual viewpoint background image to generate a virtual viewpoint image. It should be noted that the virtual viewpoint parameter and the camera parameters of the imaging apparatuses or the background model obtained from the ROM 113 are used as appropriate to generate the images described above. The generated virtual viewpoint image is transmitted to the communication control unit 2021.

Figure 9:
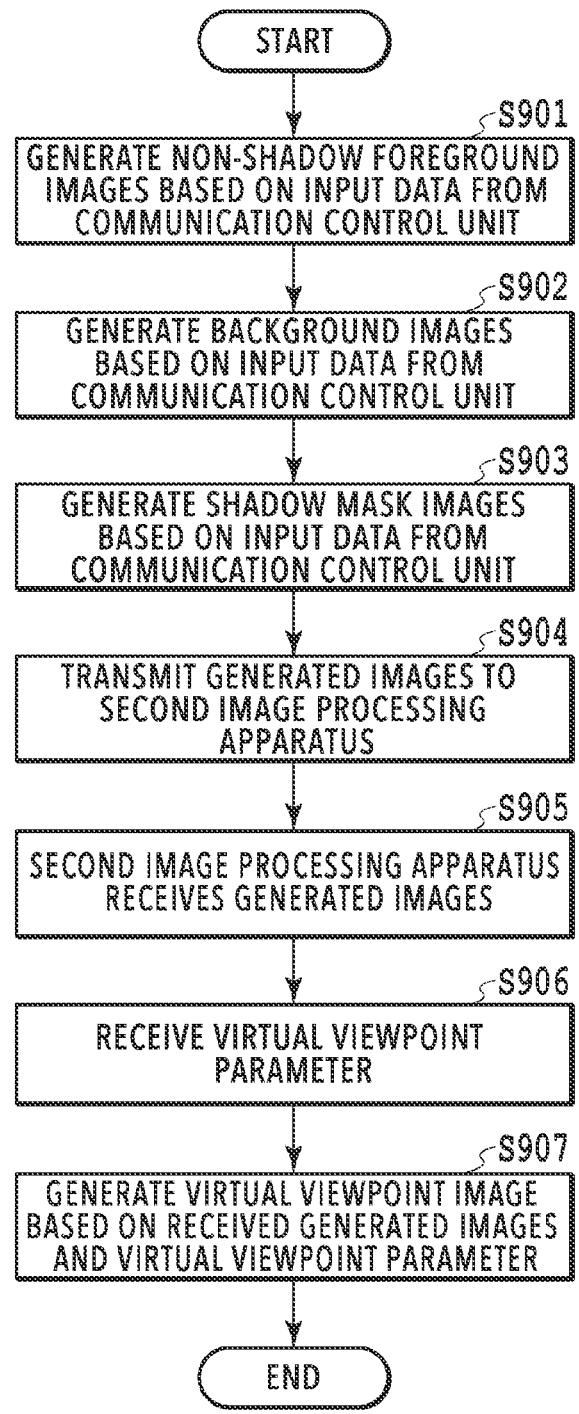
FIG. 9 is a flowchart showing an example of image processing.

FIG. 9 is a flowchart showing an example of the procedure of controlling shadow rendering in the virtual viewpoint image using the shadow mask images by the two image processing apparatuses according to the present embodiment. The flow shown in FIG. 9 is executed by the first image processing apparatus 202 and the second image processing apparatus 203. The execution of the flow of FIG. 9 is triggered by the first image processing apparatus 202 transmitting multi-viewpoint images received from the imaging system 201 to the non-shadow foreground image generating unit 2012, the background image generating unit 2013, and the shadow mask image generating unit 2014.

S901, the non-shadow foreground image generating unit 2012 separates each multi-viewpoint image into a foreground image and a background image based on the input data from the communication control unit 2011 and further separates the foreground image into a foreground object area and a shadow area to generate a non-shadow foreground image. The generated non-shadow foreground images are transmitted to the communication control unit 2011.

In S902, the background image generating unit 2013 generates background images from the multi-viewpoint images based on the input data from the communication control unit 2011. The generated background images are transmitted to the communication control unit 2011.

In S903, the shadow mask image generating unit 2014 generates shadow mask images based on the input data from the communication control unit 2011. Like the first embodiment, the shadow mask image is generated by separating each multi-viewpoint image into a foreground image and a background image, separating the foreground image into a foreground object area and a shadow area, and further binarizing the shadow area. The generated shadow mask images are transmitted to the communication control unit 2011.

In S904, the communication control unit 2011 transmits, to the second image processing apparatus 203, the images received from the non-shadow foreground image generating unit 2012, the background image generating unit 2013, and the shadow mask image generating unit 2014.

In S905, the communication control unit 2021 receives the non-shadow foreground images, background images, and shadow mask images from the first image processing apparatus 202. The received images are transmitted to the virtual viewpoint image generating unit 2022.

In S906, the communication control unit 2021 receives a virtual viewpoint parameter from the information processing apparatus 204. The received virtual viewpoint parameter is transmitted to the virtual viewpoint image generating unit 2022.

In S907, the virtual viewpoint image generating unit 2022 generates a virtual viewpoint image in which a shadow is rendered using the shadow mask images received from the communication control unit 2021. Like the first embodiment, the virtual viewpoint image is generated by generating a virtual viewpoint foreground image and a virtual viewpoint background image, generating a shadow-added virtual viewpoint background image using the shadow mask images, and combining the virtual viewpoint foreground image with the shadow-added virtual viewpoint background image. The generated virtual viewpoint image is transmitted to the communication control unit 2021 and the flow of FIG. 9 is thus ended.

After the end of the flow of FIG. 9, the communication control unit 2021 transmits the received virtual viewpoint image to the information processing apparatus 204. S901 to S903 shown in FIG. 9 are described as sequential processing but may be parallel processing.

According to the present embodiment, in a case where a virtual viewpoint image is generated by two image processing apparatuses, one of the apparatuses generates non-shadow foreground images, background images, and shadow mask images from multi-viewpoint images and the other generates a virtual viewpoint image based on these images. Although data is transmitted between the image processing apparatuses at this time, the amount of data transmission can be reduced by using the shadow mask images as shadow information as compared with the case of using color images as shadow information. The number of image processing apparatuses is two in the present embodiment hut is not limited to two and an image processing apparatus may be prepared for generating each of the foreground image, background image, and shadow mask image.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

According to the technique of the present disclosure, the amount of data for shadow rendering in generation of a virtual viewpoint image can be reduced.

This application claims the benefit of Japanese Patent Application No. 2020-085191 filed May 14, 2020, which is hereby incorporated by reference wherein in its entirety.

What is claimed is:

1. An image processing apparatus comprising:
one or more memories storing instructions; and
one or more processors executing the instructions to:
obtain background images based on images obtained by a plurality of imaging apparatuses;
obtain shadow mask images by extracting shadow areas from foreground images, wherein the foreground images are based on images obtained by the plurality of imaging apparatuses;
obtain non-shadow foreground images by removing the shadow areas from the foreground images;
obtain information about a virtual viewpoint;
generate a virtual viewpoint foreground image based on the obtained information about the virtual viewpoint and the obtained non-shadow foreground images;
generate a virtual viewpoint background image based on the obtained information about the virtual viewpoint and the obtained background images;
generate a shadow-added virtual viewpoint background image by rendering a shadow in the virtual viewpoint background image based on the obtained shadow mask images; and
generate a virtual viewpoint image based on the generated virtual viewpoint foreground image and the generated shadow-added virtual viewpoint background image,
wherein a shadow intensity in the shadow-added virtual viewpoint background image is determined based on a plurality of the obtained shadow mask images.

2. The image processing apparatus according to claim 1, wherein the one or more processors further executes the instructions to:
obtain the shadow mask images corresponding to the number of the imaging apparatuses; and
determine a pixel value used to render a shadow in a target pixel of the virtual viewpoint background image based on the number of times a position of the target pixel matches a shadow area of the shadow mask image.

3. The image processing apparatus according to claim 1, wherein the one or more processors further executes the instructions to:
set the shadow intensity in the shadow-added virtual viewpoint background image based on the number of times a position on which distance data on the virtual viewpoint background image is projected matches a shadow area of the shadow mask image.

4. The image processing apparatus according to claim 1, wherein the one or more processors further executes the instructions to:
set the shadow intensity in the shadow-added virtual viewpoint background image based on pixel values of the shadow mask images.

5. The image processing apparatus according to claim 1, wherein the shadow mask images are grayscale images.

6. The image processing apparatus according to claim 1, wherein the shadow mask images are binary images.

7. The image processing apparatus according to claim 1, wherein the one or more processors further executes the instructions to:
generate the shadow-added virtual viewpoint background image by changing a pixel value of the virtual viewpoint background image based on the number of times a position on which distance data on the virtual viewpoint background image is projected matches a shadow area of the shadow mask image.

8. The image processing apparatus according to claim 7, wherein the one or more processors further executes the instructions to:
change a pixel value of a pixel of the virtual viewpoint background image in a case where the number of times a position on which distance data on the pixel is projected matches a shadow area of the shadow mask image is equal to or greater than a predetermined threshold.

9. The image processing apparatus according to claim 7, wherein the number of times a position on which distance data on the virtual viewpoint background image is projected matches a shadow area of the shadow mask image is counted based on the shadow mask image generated from a captured image captured at the same time as captured images used to generate the virtual viewpoint background image.

10. An image processing method comprising:
obtaining background images based on images obtained by a plurality of imaging apparatuses;
obtaining shadow mask images by extracting shadow areas from foreground images, wherein the foreground images are based on images obtained by the plurality of imaging apparatuses;
obtaining non-shadow foreground images by removing the shadow areas from the foreground images;
obtaining information about a virtual viewpoint;
generating a virtual viewpoint foreground image based on the obtained information about the virtual viewpoint and the obtained non-shadow foreground images;
generating and a virtual viewpoint background image based on the obtained information about the virtual viewpoint and the obtained background images;
generating a shadow-added virtual viewpoint background image by rendering a shadow in the virtual viewpoint background image based on the obtained shadow mask images; and
generating a virtual viewpoint image based on the generated virtual viewpoint foreground image and the generated shadow-added virtual viewpoint background image,
wherein a shadow intensity in the shadow-added virtual viewpoint background image is determined based on a plurality of the obtained shadow mask images.

11. The image processing method according to claim 10, further comprising:
obtaining the shadow mask images corresponding to the number of the imaging apparatuses; and
determining a pixel value used to render a shadow in a target pixel of the virtual viewpoint background image based on the number of times a position of the target pixel matches a shadow area of the shadow mask image.

12. The image processing method according to claim 10, further comprising:
setting the shadow intensity in the shadow-added virtual viewpoint background image based on the number of times a position on which distance data on the virtual viewpoint background image is projected matches a shadow area of the shadow mask image.

13. The image processing method according to claim 10, further comprising:
setting the shadow intensity in the shadow-added virtual viewpoint background image based on pixel values of the shadow mask images.

14. The image processing method according to claim 10, wherein the shadow mask images are grayscale images.

15. The image processing method according to claim 10, wherein the shadow mask images are binary images.

16. The image processing method according to claim 10, further comprising:
generating the shadow-added virtual viewpoint background image by changing a pixel value of the virtual viewpoint background image based on the number of times a position on which distance data on the virtual viewpoint background image is projected matches a shadow area of the shadow mask image.

17. The image processing method according to claim 10, further comprising:
changing a pixel value of a pixel of the virtual viewpoint background image in a case where the number of times a position on which distance data on the pixel is projected matches a shadow area of the shadow mask image is equal to or greater than a predetermined threshold.

18. The image processing method according to claim 16, wherein the number of times a position on which distance data on the virtual viewpoint background image is projected matches a shadow area of the shadow mask image is counted based on the shadow mask image generated from a captured image captured at the same time as captured images used to generate the virtual viewpoint background image.

19. A non-transitory computer readable storage medium storing a program causing a computer to execute an image processing method, the image processing method comprising:
obtaining background images based on images obtained by a plurality of imaging apparatuses;
obtaining shadow mask images by extracting shadow areas from foreground images, wherein the foreground images are based on images obtained by the plurality of imaging apparatuses;
obtaining non-shadow foreground images by removing the shadow areas from the foreground images;
obtaining information about a virtual viewpoint;
generating a virtual viewpoint foreground image based on the obtained information about the virtual viewpoint and the obtained non-shadow foreground images;
generating a virtual viewpoint background image based on the obtained information about the virtual viewpoint and the obtained background images;
generating a shadow-added virtual viewpoint background image by rendering a shadow in the virtual viewpoint background image based on the obtained shadow mask images; and
generating a virtual viewpoint image based on the generated virtual viewpoint foreground image and the generated shadow-added virtual viewpoint background image,
wherein a shadow intensity in the shadow-added virtual viewpoint background image is determined based on a plurality of the obtained shadow mask images.

\* \* \* \* \*